United States Patent Office 2,941,112
Patented June 14, 1960

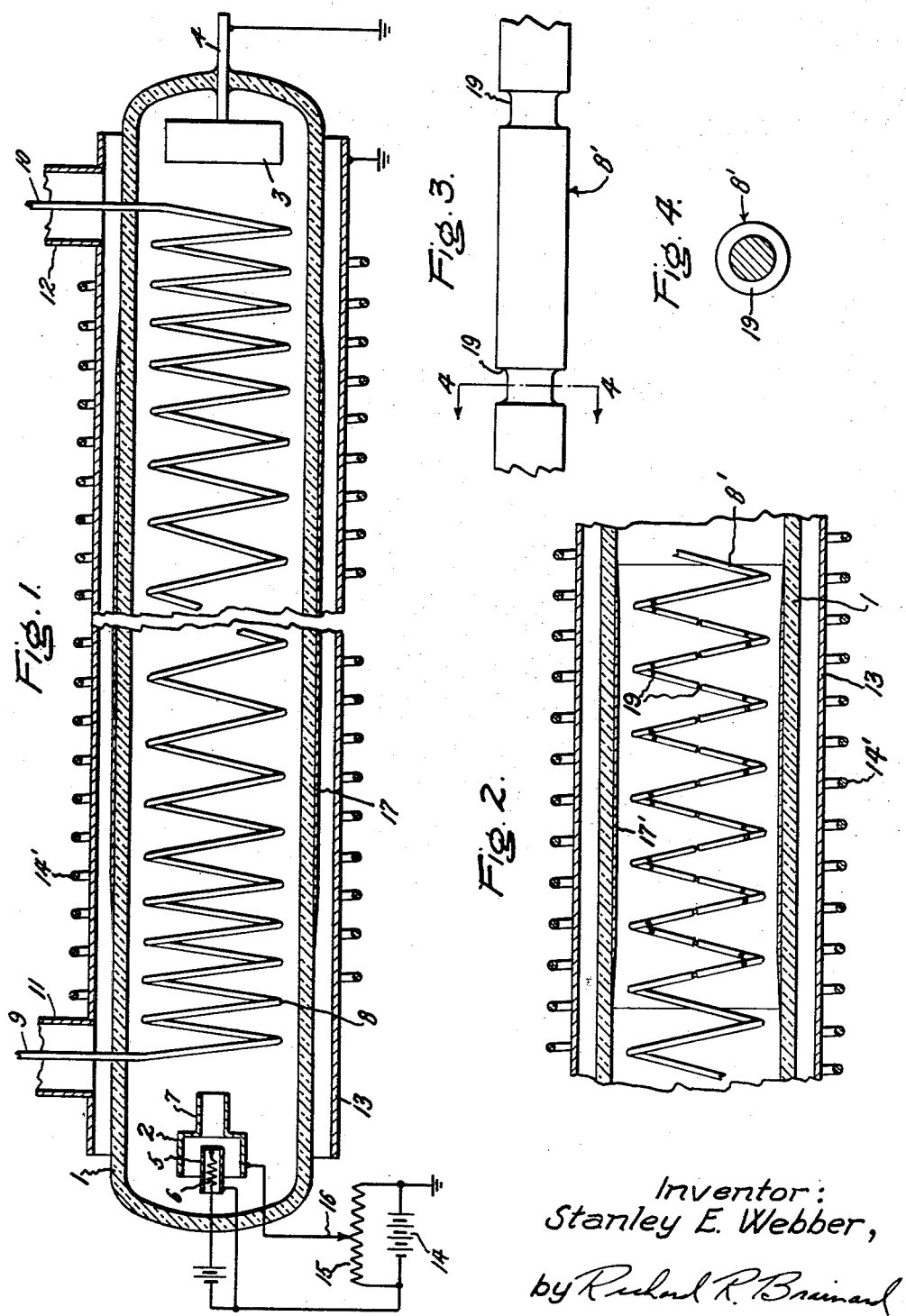
June 14, 1960     S. E. WEBBER     2,941,112
ELECTRIC DISCHARGE DEVICE
Filed July 25, 1955
Inventor:
Stanley E. Webber,
by Richard R. Brainard
His Attorney.

2,941,112

ELECTRIC DISCHARGE DEVICE

Stanley E. Webber, Schenectady, N.Y., assignor to General Electric Company, a corporation of New York Filed July 25, 1955, Ser. No. 524,002

2 Claims. (Cl. 315—3.5)

My invention relates to improved electric discharge devices of the traveling wave type.

In the class of electric discharge devices generally known as traveling wave tubes, an electron beam is passed in energy-exchanging relation with the high frequency field of a slow wave structure, i.e., a conductive structure along which an electromagnetic wave is propagated at a phase velocity, in the direction of the beam travel, which is slow compared with the velocity of light. The phase velocity is actually very close to the velocity of the electron beam or the group velocity of the bunched electrons of the beam so that energy may be exchanged in one direction or the other between the beam and the high frequency field throughout all or a substantial part of the length of the slow wave structure.

In the operation of devices of the above type as amplifiers, it is known that self oscillations tend to occur and that, unless steps are taken to minimize these oscillations, the device becomes useless as an amplifier. It has accordingly become common practice to employ an attenuator located between the input and output ends of the slow wave structure for the purpose of reducing the amplitude of the waves propagated along the structure. Hence, any waves which pass through the region of the attenuator more than once are reduced to a greater degree and the undesirable tendency of the device toward self oscillation is minimized or eliminated. Attenuators frequently used include a coating or body of relatively lossy material with respect to high frequency energy supported in proximity to the slow wave structure intermediate its input and output ends. These coatings have been applied to longitudinal supporting rods which are frequently used to support the slow wave structure or, in cases where a glass envelope is employed, a coating may conveniently be applied to either the inner or outer wall of the envelope intermediate the ends of the slow wave structure.

I have found that the presence of an attenuator changes the phase velocity of the wave along the slow wave structure. If the velocity of the electron beam and the geometry of the slow wave structure are such as to provide optimum interchange of energy between the beam and the structure in the absence of the attenuator, this change in phase velocity tends to reduce the gain and efficiency of the tube. In accordance with an important aspect of my invention, I provide structures which compensate for the effect of the attenuator on the wave velocity and in this way maintain the optimum energy-exchanging relation between the electron beam and the traveling wave of the slow wave structure.

In one specific embodiment in which the attenuator tends to increase the phase velocity along the axis of the helix, the pitch of the helix is increased in the region of the attenuator to reduce the resultant phase velocity to that which would have existed in the absence of the attenuator. In order to minimize reflections, the attenuator is preferably tapered at its ends and accordingly the change in pitch at the ends of the attenuator is gradual. In a modified form of my invention, this same effect is produced by slowing the velocity of the wave along the conductive path of the slow wave structure. This may be done, for example, by providing circumferential grooves in the helix, a very common form of slow wave structure, which tend to increase its inductance and consequently reduce the phase velocity of the wave. In another embodiment of the invention, the character and location of the attenuator is such that it tends to decrease the phase velocity and in this embodiment of my invention the compensation is effected by decreasing the pitch of the helix in the central portion of the attenuator.

In accordance with the foregoing, it is an important object of my invention to provide an improved traveling wave tube including an attenuator which is characterized by improved gain and efficiency.

It is another object of my invention to provide means for compensating for the effect of an attenuator on phase velocity in a traveling wave tube.

Further objects and advantages of my invention will become apparent as the following description proceeds, reference being had to the accompanying drawing and its scope will be pointed out in the appended claims.

In the drawing, Fig. 1 is an elevational view in section of a traveling wave tube embodying my invention.

Fig. 2 is an elevational view in section of a portion of a device similar to that illustrated in Fig. 1 and embodying a modification of my invention, Fig. 3 is an enlarged elevational view of a wire suitable for use in the helix of Fig. 2, and Fig. 4 is a sectional view taken along the line 4—4 of Fig. 3.

Referring now to Fig. 1 of the drawing, I have shown my invention embodied in a traveling wave tube including an elongated, generally cylindrical envelope 1, preferably formed of glass. Illustrated somewhat schematically at one end of the envelope is an electron gun 2 for projecting an electron beam along the axis of the envelope and at the other end is supported a suitable collecting electrode 3 including a lead-in conductor 4. The electron gun includes a source of electrons in the form of a generally cylindrical cathode 5 which may be heated to electron emitting temperature by a resistance heater illustrated at 6. Electrons from the cathode 5 are accelerated and focused by a suitable, generally cylindrical anode 7. While my invention may be applied to any type of slow wave structure, I have illustrated a simple helix 8 as extending axially of the envelope and terminating at its opposite ends respectively in spaced relation to the accelerated electrode 7 and the collecting electrode 3. The ends of the helix are brought out through the envelope by means of conductors 9 and 10 which form the inner conductors of input and output concentric transmission lines respectively which are completed by outer conductors 11 and 12. The conductors 11 and 12 are joined to a cylindrical conductor 13 which surrounds the envelope 1 in spaced relation thereto and extends a little beyond the helix at each end of the tube. It will be understood that, in operation of the device, a collimating axial magnetic field is provided by means of suitable permanent magnetic or electromagnetic means. A suitable electromagnetic field producing means is shown schematically as a coil 14'. For this reason the cylinder 13 is formed of non-magnetic material, such as copper or stainless steel. While a simple concentric line type of input and output connection has been illustrated, it will be apparent to those skilled in the art that other forms of coupling with the slow wave structure may be provided, if desired.

In the drawing, I have shown a source of direct current voltage as including a battery 14 shunted by a resistance 15. The negative terminal of the battery is connected to the cathode and the positive terminal is grounded. The collector electrode, outer conductor 13 and also the helix 8 are operated at direct current ground potential. The accelerating electrode 7 is preferably operated at an adjustable direct current voltage provided by the tap 16 on the resistor 15.

As will be well understood by those familiar with the operation of traveling wave tubes, a high frequency signal impressed on the input circuit including conductors 9 and 11 will appear at the output circuit including conductors 10 and 12 in amplified form, provided the velocity of the beam passing from the electron gun to the collector electrode is suitably adjusted, by means of the position of tap 16 with respect to the geometry of the slow wave structure, specifically the helix 8 in the illustrated embodiment. It is also well known that these structures tend to oscillate unless some means is provided for attenuating any waves which tend to make multiple excursions along the length of the helix. As illustrated in Fig. 1 of the drawing, this may be accomplished by a layer of lossy material in the form of a coating 17 applied to the exterior of the envelope in the form of a cylindrical path. The coating may be aquadag, for example, and of a thickness which will give the desired surface resistance and hence a desired amount of attenuation. The resistance may have a value of 1000 ohms per square unit of surface area. The ends of the coating are preferably tapered in thickness, as illustrated, to minimize reflections. If the pitch of the helix were to remain constant throughout the length of the helix and at a value which would be optimum, considering the velocity of the electron beam as established by the direct current potential, the presence of the attenuator would tend to change the phase velocity along the helix and cause operation of the device at less than the maximum gain and efficiency. I have found that by properly compensating for this change in phase velocity, the adverse effect of the attenuator on gain and efficiency of the tube may be minimized. In the modification shown in Fig. 1, the attenuator increases the phase velocity as compared with the phase velocity without an attenuator over a substantial range of attenuator resistance values. Accordingly, the pitch of the helix is increased in the region of the attenuator to maintain the same relationship between the traveling wave and the electron beam as would exist in the absence of the attenuator. Since the thickness of the attenuator increases gradually, the increase in pitch of the helix has been made gradual. It will be appreciated that the length of the attenuator and the amount of increase in the pitch of the helix have been exaggerated to emphasize applicant's invention.

The effect of the attenuator on the phase velocity of the high frequency wave of the slow wave structure varies with the surface resistance of the attenuator, its physical location and the operating frequencies of the device. The present invention contemplates a compensation for the effect of the attenuator on phase or wave velocity after the other operating conditions have been established. In the modification shown in Fig. 1, the attenuator resistance may be considered as separated from the helix by distributed shunt capacitance provided by the glass envelope. If the attenuator is located within the envelope and in proximity to the helix, it tends to reduce the phase velocity of the high frequency wave on the slow wave structure. It is apparent that this effect on phase velocity may be compensated for by compressing the turns of the helix, i.e., reducing the pitch in the region of the attenuator. The same end result may also be obtained by reducing the wave velocity along the helix by increasing the inductance thereof. In Figs. 2–4, inclusive, I have shown a modification of my invention having an attenuator consisting of a hollow cylindrical body 17' of lossy insulating material surrounding the helix 8' and located inside the wall of the envelope 1. The decrease in phase velocity that would result from this attenuator is compensated by increasing the inductance of the helix in the region of the attenuator. As illustrated more clearly in enlarged Figs. 3 and 4, the wire from which this portion of the helix is wound is shaped to provide circumferential grooves 19 at spaced points along the length of the wire and thereby provide discrete areas of reduced cross-section which increase the inductance of the helix wound from this wire.

While I have shown and described particular embodiments of my invention, it will be apparent to those skilled in the art that changes and modifications may be made without departing from the invention in its broader aspects and I aim in the appended claims to cover all such changes and modifications as fall within the true spirit and scope of my invention.

What I claim as new and desire to secure by Letters Patent of the United States is:

1. A high frequency amplifier of the traveling wave type comprising a slow wave transmission circuit having an input end and an output end, means impressing a wave to be amplified upon the input end of said circuit to initiate travel of the waves therealong, electrode means projecting an electron stream at a predetermined average velocity along at least a portion of said circuit in the direction of wave travel and in the electric field associated with said traveling waves, said slow wave circuit having a wave propagating characteristic making the velocity of said waves therealong in the region of said electron stream substantially the same as said predetermined average velocity of said stream, high frequency loss material supported in the region of said field intermediate the ends of said slow wave structure for reducing the tendency of said circuit toward self oscillation and tending to increase the wave velocity along said slow wave circuit, said slow wave circuit having discrete areas of reduced cross section at spaced points along its length in the region of said loss material to modify the propagation characteristic of said circuit in the region of said loss material and compensate for the effect on the velocity of wave transmission of said loss material.

2. A high frequency amplifier of the traveling wave type comprising a helix having an input end and an output end, means impressing a wave to be amplified upon the input end of said helix to initiate travel of the waves therealong, electrode means projecting an electron stream at a predetermined average velocity along at least a portion of said helix in the direction of wave travel and in the electric field associated with said traveling waves, said helix having a wave propagating characteristic making the velocity of said waves therealong in the region of said electron stream substantially the same as the velocity of said stream, high frequency loss material supported in the region of said field intermediate the ends of said helix for reducing the tendency of said helix toward self oscillation and tending to increase the wave velocity along said slow wave structure, said helix having discrete areas of reduced cross section at spaced points along its length in the region of said loss material compensating for the effect on the velocity of wave transmission along said helix due to said loss material.

References Cited in the file of this patent

UNITED STATES PATENTS

| | | |
|---|---|---|
| 2,575,383 | Field | Nov. 20, 1951 |
| 2,584,597 | Landauer | Feb. 5, 1952 |
| 2,636,948 | Pierce | Apr. 28, 1953 |
| 2,707,759 | Pierce | May 3, 1955 |
| 2,767,259 | Peter | Oct. 16, 1956 |
| 2,817,037 | Peter | Dec. 17, 1957 |
| 2,828,440 | Dodds et al. | Mar. 25, 1958 |

FOREIGN PATENTS

| | | |
|---|---|---|
| 841,311 | Germany | June 13, 1952 |
| 153,259 | Australia | Sept. 17, 1953 |
| 63,878 | France | May 4, 1955 |
| | (IRE addition to principal patent, 946,141) | |